US007010016B2

(12) United States Patent
Margulis et al.

(10) Patent No.: US 7,010,016 B2
(45) Date of Patent: Mar. 7, 2006

(54) METHOD AND WCDMA RECEIVER FOR HIGH-RATE AND LOW-RATE PHYSICAL CHANNEL RECEPTION

(75) Inventors: Alex Margulis, Ashdod (IL); Rafi Zack, Givat-Shmuel (IL); Udi Ben-David, Oranit (IL); Dotan Sokolov, Ranana (IL)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 10/025,090

(22) Filed: Dec. 19, 2001

(65) Prior Publication Data

US 2003/0112855 A1 Jun. 19, 2003

(51) Int. Cl.
*H04B 1/69* (2006.01)
(52) U.S. Cl. ...................................... 375/147
(58) Field of Classification Search ................ 375/130, 375/144, 147, 148, 150, 316; 370/320, 328, 370/335
See application file for complete search history.

(56) References Cited

U.S. PATENT DOCUMENTS

| | | | | |
|---|---|---|---|---|
| 5,719,899 | A * | 2/1998 | Thielecke et al. | 375/144 |
| 5,805,585 | A * | 9/1998 | Javitt et al. | 370/342 |
| 6,215,814 | B1 | 4/2001 | Ylitalo et al. | 375/148 |
| 6,266,365 | B1 | 7/2001 | Wang et al. | 375/150 |
| 6,269,126 | B1 | 7/2001 | Toskala et al. | 375/265 |
| 6,285,863 | B1 | 9/2001 | Zhang | 455/234.1 |
| 6,301,289 | B1 | 10/2001 | Bejjani et al. | 375/144 |
| 6,381,229 | B1 * | 4/2002 | Narvinger et al. | 370/328 |
| 6,862,314 | B1 * | 3/2005 | Jurgensen et al. | 375/142 |
| 2002/0101909 | A1 * | 8/2002 | Chen et al. | 375/147 |

FOREIGN PATENT DOCUMENTS

EP -0964528 12/1999

OTHER PUBLICATIONS

Baier, Alfred, "Open Multi-Rate Radio Interface Architecture Based On CDMA", *IEEE* 1993, 985-989.
Latva-Aho, Matti, "Bit Error Probability Analysis for Frames WCDMA Downlink Receivers", *IEEE* 1998, 1119-1133.

* cited by examiner

*Primary Examiner*—Robert Pascal
*Assistant Examiner*—Krista Flanagan
(74) *Attorney, Agent, or Firm*—Schwegman, Lundberg, Woessner & Kluth, P.A.

(57) ABSTRACT

A spread-spectrum receiver has a high-rate path to receive multi-rate channels and a low-rate path to receive fixed-rate channels. In a wideband code division multiple access (WCDMA) embodiment, the high-rate path despreads multi-rate physical channels having a variable spreading factor and the low-rate path despreads physical channels having a fixed spreading factor. The high-rate path may have high-rate rake fingers to despread multipath components of the multi-rate channels. Each multi-rate channel may have a different spreading code allowing for multicode reception. The high-rate path may also include a high-rate rake with finger engines implemented in hardware to multiply symbols with a channel estimation, and a combiner to combine the multipath components. The low-rate path may include low-rate fingers to despread multipath components of the fixed-rate channels and a processor to generate a channel estimation and coherently combine symbols from the low-rate fingers with the channel estimation.

26 Claims, 3 Drawing Sheets

METHOD AND WCDMA RECEIVER FOR HIGH-RATE AND LOW-RATE PHYSICAL CHANNEL RECEPTION

FIELD OF THE INVENTION

The present invention pertains to spread-spectrum communications.

BACKGROUND OF THE INVENTION

Code division multiple access (CDMA), and particularly direct sequence CDMA, is a technique for spread-spectrum digital communications used for many applications, including, for example, mobile communications. In direct sequence CDMA, data signals are combined with a spreading waveform in the form of a pseudo-random-noise (PN) code to form a coded signal for transmission. The code has a frequency (i.e., the chip rate) which may be a multiple of the frequency (i.e., the bit-rate or symbol-rate) of the data signal, so that an effect of combining the data signal and the spreading waveform is that the bit period is divided into smaller chip periods. At the receiver, the signal is combined with the same spreading code to extract the data signal. The technique provides high data capacity by spreading signal energy over a wide bandwidth to increase bandwidth utilization and reduce the effects of narrow band interference. In direct sequence CDMA, the spreading code of the transmitter and receiver should be synchronized within as little as one chip period to achieve reliable communication. Multipath effects make synchronization more difficult since the wireless channel from a base station to a reception device may have several paths of different time-delays which may vary due to the movement of the reception device.

One problem with receiving CDMA signals, and in particular, wide band CDMA (WCDMA) signals, is that the data-rate of some channels may be fixed (i.e., having a predetermined spreading factor) while the data rate or other channels may vary because the spreading factor may vary significantly. Processing these different data-rate signals may be done either with software within a digital signal processor (DSP) for example, or with hardware. Processing these signals with software may consume significantly more power than processing these signals directly in hardware, however processing these signals with software may require less space/area than hardware processing may require and also may provide more flexibility. This tradeoff between power consumption and space is particularly important for portable communication devices, particularly wireless communication devices which desire to be both smaller and consume less power.

Thus, there is a general need for a method and receiver that helps balance the tradeoff between hardware and software for processing spread spectrum signals. There is also a need for a method and receiver that more efficiently processes spread spectrum signals. There is also a need for a method and receiver that more efficiently processes WCDMA channels. There is also a need for a method and receiver for processing fixed rate as well as multi-rate channels. There is also a need for a method and receiver suitable for portable communication devices.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

Figure 1:
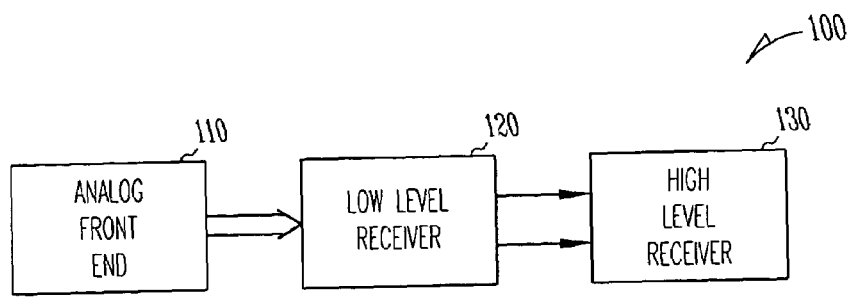
FIG. 1 is a simplified functional block diagram of a portion of a spread-spectrum reception device in accordance with an embodiment of the present invention.

The description set out herein illustrates the various embodiments of the invention and such description is not intended to be construed as limiting in any manner. FIG. 1 is a simplified functional block diagram of a portion of a spread-spectrum reception device in accordance with an embodiment of the present invention. Reception device 100 includes analog front end 110 coupled with low-level receiver 120 which is coupled with high-level receiver 130. Reception device 100 may be a one-way or two-way communication device, such as, for example, a wireless telephone, a two-way radio, or a receiver that is part of end user equipment. Device 100, among other things, despreads and decodes spread-spectrum signals. Analog front end 110 provides the I and Q components from the received signals. In a Wideband Code Division Multiple Access (WCDMA) embodiment, low-level receiver 120 despreads and decodes physical channels and high-level receiver 130 may map the physical channels to transport channels. WCDMA may apply a two-layered code structure that includes an orthogonal spreading code and pseudo-random scrambling codes. Spreading is performed using channelization codes which transform a data symbol into a number of chips which increase the bandwidth of the signal to create a spread-spectrum signal. Orthogonality between the different spreading codes may be achieved by tree-structured orthogonal codes. Spreading codes for example, may include Gold codes, Walsh codes, Hadamard codes, orthogonal variable spreading factor (OVSF) channelization codes and/or other sequences. Scrambling codes may be used, for example, for cell separation in the downlink and user separation in the uplink.

In one embodiment, receiver 100 supports code division multiple access (CDMA) communications. In another embodiment, receiver 100 supports WCDMA communications. In another embodiment, receiver 100 supports frequency division duplex (FDD) WCDMA communications, and in yet another embodiment, receiver 100 supports WCDMA communications for the substantially simultaneous reception of high-rate and low-rate physical channels.

In one embodiment, a spread-spectrum receiver has a high-rate path to receive multi-rate channels and a low-rate path to receive fixed-rate channels. The high-rate path despreads physical channels having a variable spreading factor and the low-rate path despreads physical channels having a predetermined spreading factor. The high-rate path may have high-rate rake fingers to despread multipath components of the multi-rate channels. Each multi-rate channel may have a different spreading code allowing for multicode reception. The high-rate path also includes a high-rate rake having one or more finger engines to multiply data symbols with a channel estimation and a combiner to combine multipath components. The high-rate rake fingers and the high-rate rake may be implemented with hardware elements. The low-rate path may include low-rate fingers to despread multipath components of the fixed-rate channels and a digital signal processor (DSP) to generate a channel estimation and coherently combine symbols from the low-rate fingers with the channel estimation. Receiver 100 may be suitable for, among other things, receipt of spread-spectrum signals including, for example, WCDMA signals, IS-95 CDMA signals, and other direct sequence CDMA signals. In at least one of the embodiments, receiver 100 supports the reception of multicode channels where several parallel dedicated physical channels are transmitted with different spreading codes and may use the same spreading factor.

Figure 2:
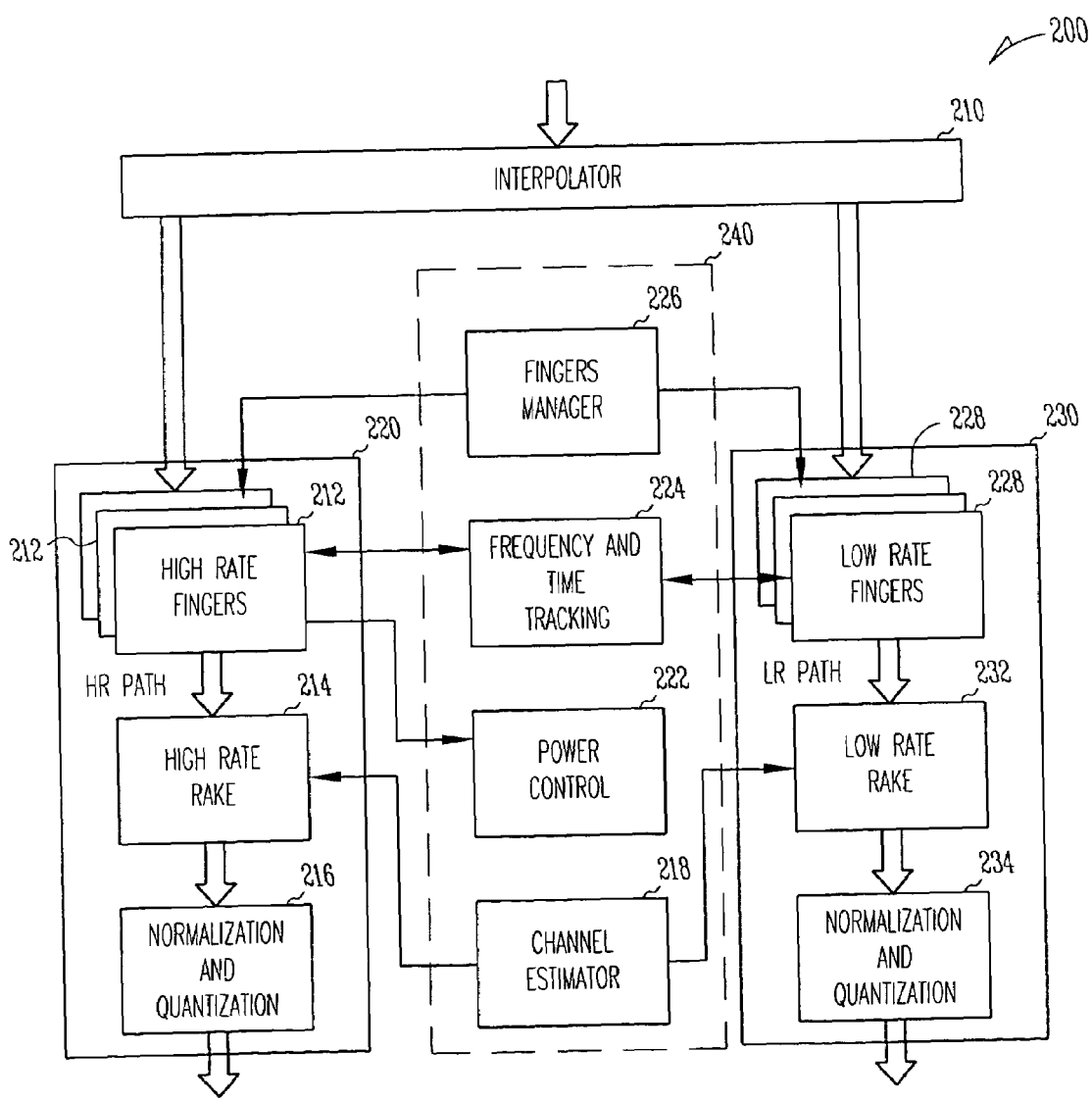
FIG. 2 is a functional block diagram of a low-level receiver in accordance with an embodiment of the present invention.

FIG. 2 is a functional block diagram of a low-level receiver in accordance with an embodiment of the present invention. Low-level receiver 200 is comprised of interpolator 210, high-rate path 220, low-rate path 230 and processing elements 240. High-rate path 220 may provide for the reception of multi-rate channels and low-rate path 230 may provide for the reception of fixed-rate channels. For example, physical channels having spreading factors of at least between 4 and 256 and greater with channel bit-rates of at least between 30–960 kbps and greater may be processed by high-rate path 220. In one embodiment, high rate path 220 may receive physical channels having a spreading factor of 512 for example, for dedicated channels.

Physical channels having a predetermined spreading factor (e.g., SF=256 with a bit-rate of 30 kbps) may be despread by low-rate path 230. Channels, such as physical channels, are made up of radio frames and time-slots. In accordance with a WCDMA embodiment of the present invention, the length of a frame, for example, may be 10 ms and a frame may include, for example, 15 time-slots. Each time-slot has fields containing bits. The number of bits per time-slot may depend on the spreading factor and the slot format of the physical channel.

Interpolator 210 receives baseband samples (both I and Q) from an analog front-end and raises the sampling rate of the baseband samples to provide the baseband samples with an increased sampling rate to the high-rate path and the low-rate path. The higher sampling rate may be used by the fingers of receiver 100 in resolving multipath components of the channels. For example, interpolator 210 may receive baseband samples at rate of four times the chip-rate and may raise the sampling rate to eight times the chip rate. Interpolator 210 may be implemented with filter elements and, for example, flip-flop and logic circuitry.

High-rate path 220 includes at least one high-rate rake finger 212 to despread spread-spectrum signals comprising the multi-rate channels. Each multi-rate channel may have a different spreading code allowing for the substantially simultaneous reception of several multi-rate channels (i.e., multicode reception). In one embodiment, high-rate path 220 may include up to six or more high-rate rake fingers 212 to despread multi-path components of the signals. High-rate path 220 also includes high-rate rake 214. High-rate rake 214 reads data symbols from high-rate rake fingers 212 and multiplies the symbols by a channel estimation for each multipath component. High-rate rake 214 also combines the multipath components for each of the multi-rate channels. Control symbols from the multi-rate channels may be provided to processing elements 240 for control functions including, for example, power control. Normalization and quantization element 216 may perform, for example, a slot and frame normalization on the data symbols and may use an exponent mantissa method. Fingers 212 and rake 214 may be implemented with hardware elements and element 216 may be implemented with a processor configurable with software, such as a digital signal processor (DSP).

Processing elements 240 include fingers manager 226, frequency and time-tracking element 224, power control element 222 and channel estimator 218. Processing elements 240 may be implemented by one or more processors configured with software, and may include one or more DSPs.

Low-rate path 230 includes one or more low-rate fingers 228 to despread multipath components of spread-spectrum signals comprising the fixed-rate channels, and a low-rate rake 232 to coherently combine symbols from low-rate fingers 228 with a channel estimation. Low-rate fingers 228 may be implemented with hardware elements, and low-rate rake 232 may be implemented by a processor configurable with software, such as a DSP. The processor may also include channel estimator 218 which generate the channel estimations for the multipath components which are coherently combined with symbols from a low-rate finger 228. Low-rate path 230 also includes normalization and quantization element 234 which may be implemented, for example, by one or more software configured processors.

It should be noted that although processing elements 240, low-rate rake 232, and normalization and quantization elements 216 and 234 are illustrated as separate functional elements, they may be implemented by one or more processors configured with software, such as one or more DSPs. Fingers manager 226 may assign one of high-rate fingers 212 to a multi-path component of the several multi-rate channels. Fingers manager 226 may also assign one low-rate finger 228 a multi-path component of the fixed-rate channels.

Figure 3:
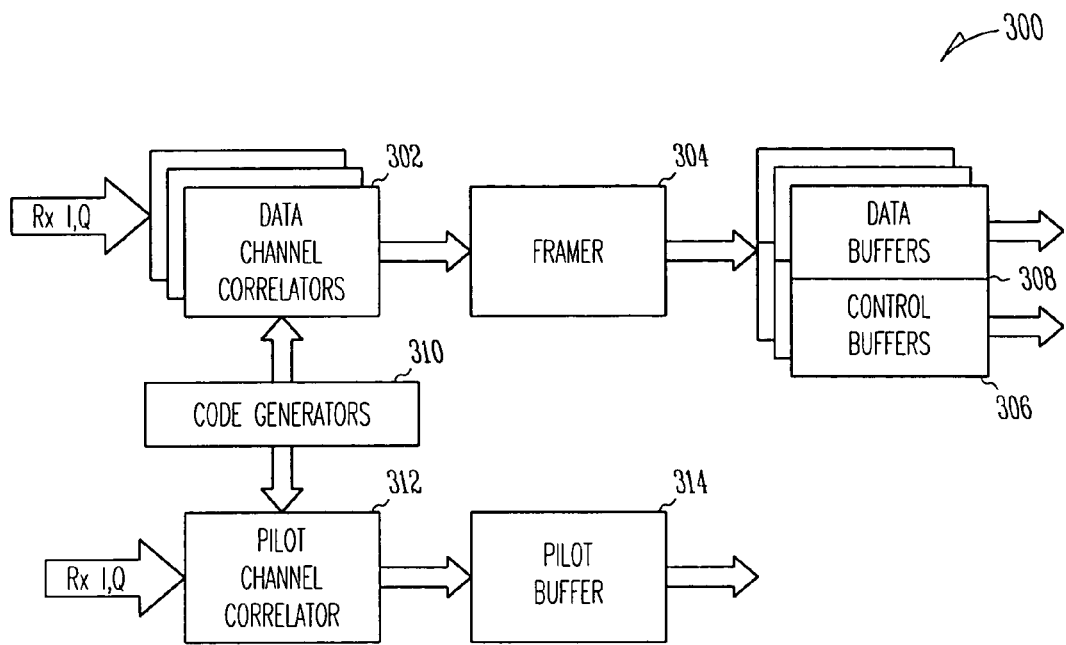
FIG. 3 is a functional block diagram of a high-rate rake finger in accordance with an embodiment of the present invention.

FIG. 3 is a functional block diagram of a high-rate rake finger in accordance with an embodiment of the present invention. High-rate rake finger 300 despreads (and may also descramble) received signals from a channel and generates complex symbols for further processing. Each finger 300 despreads the received signals with one of data channel correlators 302. Each finger despreads one component of a multipath signal. The number of fingers 300 depends on the channel profile and chip rate. The higher the chip rate, the more resolvable paths. Therefore more rake fingers 300 may be utilized to catch the energy from the channel to help maintain good performance. A very large number of fingers 300, however, may result in increased combining losses.

Due to a movement of receiver 100, especially when embodied in a hand-held mobile communication device, the scattering environment will change and thus the delays and attenuation factors will change. Rake fingers 300 may be reallocated, for example, by fingers manager 226 (FIG. 2) whenever delays have changed a significant amount. Small changes (e.g., less than one chip) may be taken care of by a code tracking loop embodied in frequency and time tracking element 224 (FIG. 2) which may track the time-delay of each multipath component of the spread-spectrum signals.

Data channel correlators 302 despreads and descrambles a physical channel with the proper spreading and/or scrambling code for the channel. In accordance with one embodiment, for example the WCDMA embodiment, each data channel correlator 302 despreads and/or descrambles one of several parallel downlink physical channels (DPCH), each having been spread at the transmitter with different spreading codes and having the same spreading factor. In other words, when multicode transmission is employed, data channel correlators 302 despread and/or descramble multicode physical channels. The physical channels may, for example have spreading factors ranging, for example, between at least 4–256 or greater which correspond with different data bit-rates. Other physical channels that may be despread and/or descrambled by correlators 302 include, for example, the secondary common control physical channel (SCCPCH).

In one embodiment, high-rate finger 300 includes pilot channel correlator 312 and pilot channel buffer 314. Pilot channel correlator 312 descrambles and/or despreads a fixed-rate physical channel, such as, for example in a WCDMA embodiment, a common pilot channel (CPICH) physical channel. The common pilot physical channel may have a fixed or predetermined spreading factor such as 256, for example. The fixed-rate physical channel is despread and/or descrambled by pilot channel correlator 312 with a spreading code and scrambling code.

In correlators 302 and 312, the received signal is correlated by time-aligning the spreading/scrambling code with the delay of the multipath component. Code generators 310 generate the appropriate scrambling code and spreading codes for the channels to be despread and/or descrambled.

Framer 304 receives symbols from the correlators and separates the symbols according to slot format. Symbols from data channels are stored in data channel buffers 308 and symbols from control channels are stored in control channel buffers 306. In one embodiment, high-rate finger 300 may have several control channel buffers 306 and several data channel buffers 308 which correspond with one of correlators 302 to receive respectively the control and data channel bits from the associated one of the several parallel dedicated physical channels.

Control channel buffers 306 supply complex symbols from the control channels to the receiver for processing. Data channel buffers 308 supply the complex symbols from the data channels to a finger engine of high-rate rake 214 (FIG. 2). Pilot channel buffer 314 receives symbols from pilot channel correlator 312 and stores the pilot channel symbols. The pilot channel symbols may be used, for example, for channel estimation by channel estimator 218 and fingers manager 226 (FIG. 2), and for frequency tracking and time tracking by frequency and time tracking element 224 (FIG. 2).

Finger 300 may be implemented with hardware elements. For example, correlators 302 and 312 may be comprised of multipliers and accumulator elements, framers 304 may be comprised of counters and comparators configured to identify fields in a slot format. Buffers 306 and 308 may be memory elements, and code generators 310 may be shift registers with logic elements.

Figure 4:
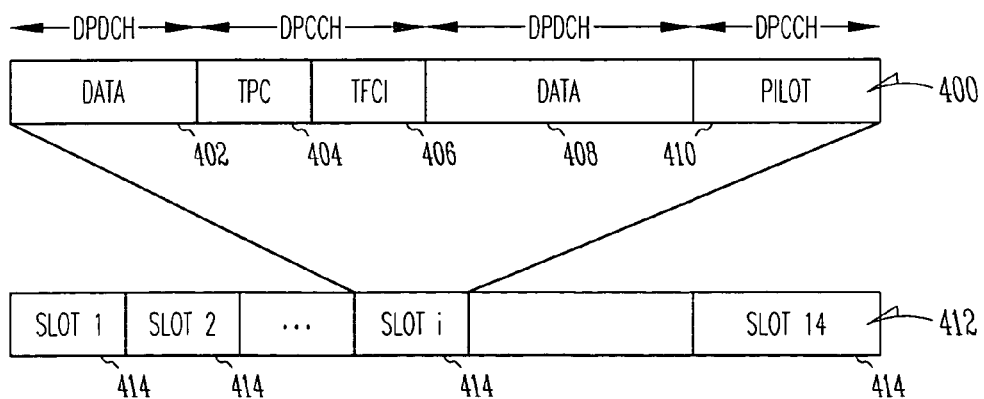
FIG. 4 illustrates an example slot format for a physical channel suitable for reception in accordance with an embodiment of the present invention.

FIG. 4 illustrates an example slot format for a physical channel. Physical channel 400 may include data channels 402, 408 and control channels 404, 406 and 410. In a WCDMA embodiment, physical channel 400 may be a Dedicated Physical Channel (DPCH), data channels may be Downlink Physical Data Channels (DPDCH), and control channels may be Downlink Physical Control Channels (DPCCH). In this embodiment, DPCCH may include respectively, transport power control (TPC) information, an optional transport format combination indicator (TFCI) and pilot bits. Channel 400 may be a dedicated channel that is time-multiplexed within time-slots 414. A plurality of time-slots 414 may comprise one radio frame 412. Channel 400 is a multi-rate channel that may have been spread with a spreading factor ranging, for example, between 4 and 256 or greater. The spreading factor determines the number of bits per slot. Channel 400 is an example of one of several multi-rate channels that may be processed substantially simultaneously by high-rate path 220 (FIG. 2).

Figure 5:
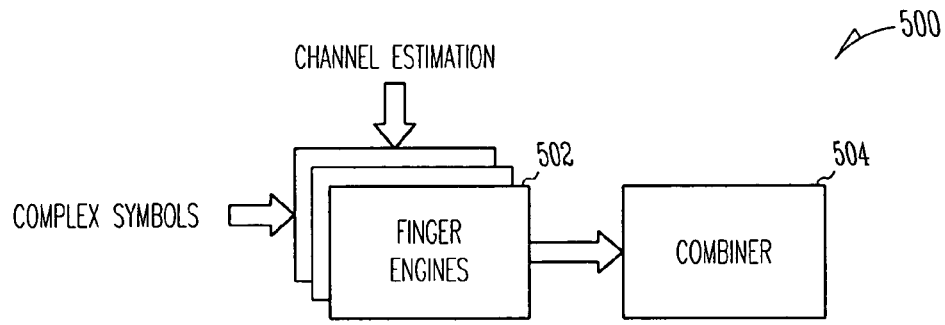
FIG. 5 is a functional block diagram of a high-rate rake in accordance with an embodiment of the present invention.

FIG. 5 is a functional block diagram of a high-rate rake in accordance with an embodiment of the present invention. High-rate rake 500 may be used for high-rate rake 214 (FIG. 2) to combine the complex symbols from each of the high-rate fingers 212 (FIG. 2). High-rate rake 500 comprises a plurality of finger engines 502 and combiner 504. After each rake finger 212 despreads the received signal with a correlator, for coherent demodulation, finger engine 502 may read the complex symbols representing the despread signal from one of data buffers 308 (FIG. 3) and may multiply the despread signal by an inverse of the channel estimation. The channel estimation may be a complex amplitude and is used to correct phase error and to weight each finger according to a combining strategy. Combining strategies may include, for example, maximal ratio or equal gain combining. Channel estimator 218 (FIG. 2) may continually measure the multipath profile to provide corrections to the channel estimations as the multipath components change. Fingers 212 (FIG. 2) may be reallocated accordingly by fingers manager 226 (FIG. 2). Combiner 504 combines the complex symbols for subsequent normalization and quantization by element 216 (FIG. 2).

In one embodiment, the receiver may support multicode functionality to receive several multi-channel signals substantially simultaneously. In a WCDMA embodiment, several parallel dedicated physical channels having different channelization/spreading codes may be processed together by each high-rate finger 300 (FIG. 3). Each finger engine 502 may multiply data symbols from each of the physical channels by an inverse of the channel estimate. Combiner 504 separately combines the complex symbols for each of the separate parallel channels for subsequent normalization and quantization by element 216 (FIG. 2).

High-rate rake 500 may be implemented with hardware elements. For example, finger engines 502 may be complex multipliers and combiner 504 may be a symbol combiner.

Figure 6:
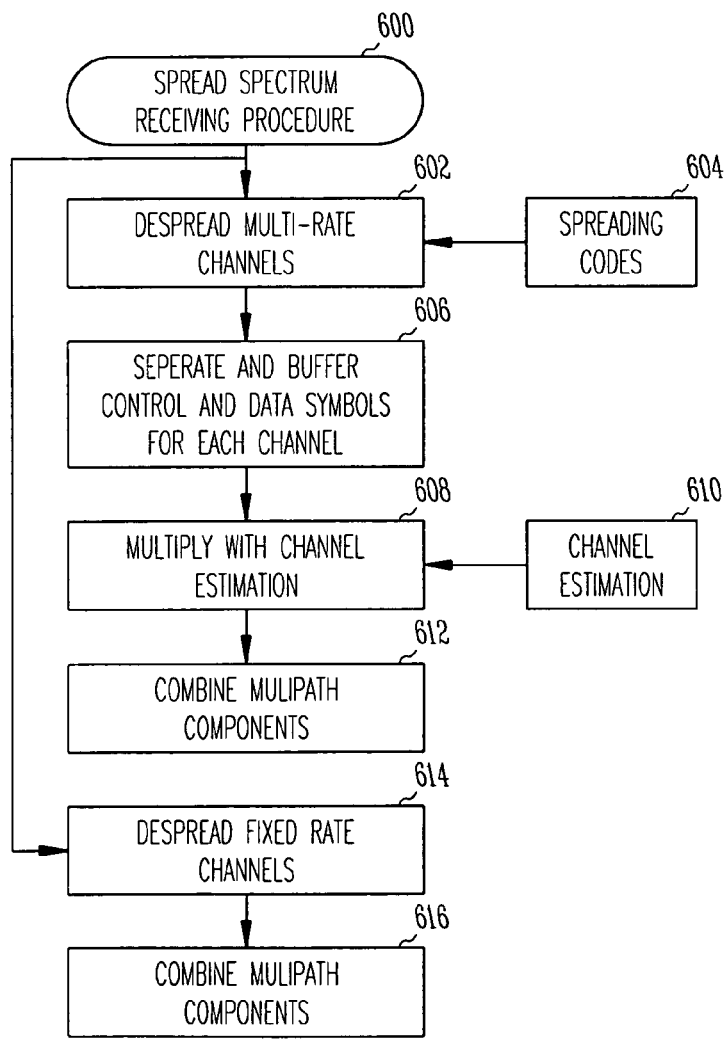
FIG. 6 is a flow chart of a spread-spectrum receiving procedure in accordance with an embodiment of the present invention.

FIG. 6 is a flow chart of a spread-spectrum receiving procedure in accordance with an embodiment of the present invention. Procedure 600 may be performed by a spread-spectrum receiver such as low-level receiver 200 (FIG. 2) although other receivers may also be suitable. For example, operations 602 through 612 may be performed by high-rate path 220 and operations 614 through 616 may be performed by low-rate path 240. Operations 602, 606, 608, 612 and 614 may be performed directly by hardware and operations 604, 610 and 616 may be performed by one or more processors configured with software.

Operation 602 despreads and may descramble multi-rate channels with spreading codes and scrambling codes generated in operation 604. A high-rate rake finger may despread/descramble spread-spectrum signals comprising the multi-rate channels. Each multi-rate channel despread/descrambled in operation 602 may have a different spreading code allowing for the substantially simultaneous reception of several multi-rate channels to support multicode operation.

Operation 606 separates the control and data symbols for each of the multi-rate channels and may store the control and data symbols in separate buffers. The control symbols may be provided to a processor for system control functions. Operation 608 multiplies the data symbols from each rake finger with a channel estimation. Operation 610 generates a channel estimation for the multi-path components of the received signals. Operation 612 combines the multipath components for each of the multi-rate channels.

Operation 614 despreads and may descramble one or more fixed-rate channels with appropriate spreading and/or scrambling codes generated in operation 604, and operation 616 multiplies the resulting symbols with a channel estimation and combines the multipath components of the fixed-rate channels. In a WCDMA embodiment, the spreading and scrambling codes of the fixed rate channel differ from the spreading and scrambling codes of the multi-rate channels.

Although the individual operations of procedure 600 are illustrated and described as separate operations, it should be noted that one or more of the individual operations may be performed concurrently. Further, nothing necessarily requires that the operations be performed in the order illustrated. For example, operations 602 through 612 may be performed substantially simultaneously with operations 614 through 616.

Thus, a method and improved spread-spectrum receiver has been described. The receiver has a high-rate path to receive multi-rate channels and a low-rate path to receive fixed-rate channels. In one embodiment, the high-rate path despreads physical channels having a variable spreading factor and the low-rate path despreads physical channels having a fixed spreading factor. The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A spread-spectrum receiver comprising:
   a high-rate signal-processing path to despread spread-spectrum signals of multi-rate channels with a plurality of despreading factors; and
   a low-rate signal-processing path to despread spread-spectrum signals of fixed-rate channels with a predetermined despreading factor,
   wherein the high-rate signal-processing path and the low-rate signal-processing path comprise parallel signal-processing paths to concurrently despread the multi-rate and fixed-rate channels and generate, respectively, first and second data outputs.

2. The receiver of claim 1 wherein the receiver is a wideband code division multiple access (WCDMA) receiver and the high-rate signal-processing path despreads spread-spectrum multi-rate physical channels having a variable spreading factor and the low-rate signal-processing path despreads fixed-rate spread-spectrum physical channels having a fixed spreading factor.

3. The receiver of claim 2 wherein the high-rate signal-processing path comprises at least one high-rate rake finger to despread spread-spectrum signals comprising the multi-rate channels, each multi-rate channel having a different spreading code allowing for substantially simultaneous despreading of more than one of several multi-rate channels.

4. The receiver of claim 3 wherein at least one high-rate rake finger comprises:
   a set of correlators, each correlator to despread one multi-rate channel of the several received multi-rate channels with an associated spreading code;
   a framer to separate control symbols and data symbols for each of the despread multi-rate channels; and
   a buffer for each multi-rate channel to store the control and data symbols for the corresponding multi-rate channel.

5. The receiver of claim 4 wherein at least one high-rate rake finger further comprises a code generator to generate the associated spreading codes for despreading each of the several multi-rate channels.

6. The receiver of claim 5 wherein at least one high-rate rake finger further comprises:
   a pilot channel correlator to despread a pilot channel having a predetermined spreading factor; and
   a pilot channel buffer to store symbols from the despread pilot channel received from the pilot channel correlator, wherein the code generator also generates a spreading code for despreading by the pilot channel correlator.

7. The receiver of claim 1 wherein the multi-rate channels have a spreading factor ranging approximately from 4 to 256, and the fixed-rate channels has a spreading factor of approximately 256.

8. The receiver of claim 1 wherein the high-rate signal-processing path further comprises a first rake and wherein the low-rate signal-processing path comprises second rate, the first and second rates to generate, respectively, first and second data outputs.

9. The receiver of claim 3 wherein the high-rate signal-processing path further comprises a high-rate rake to read symbols from at least one high-rate rake finger and to multiply the symbols by a channel estimation, and
   wherein the low-rate signal-processing path comprises a low-rate rake to read symbols from a low-rate rake finger and to multiply the symbols by a channel estimation.

10. The receiver of claim 9 wherein the high-rate rake is comprised of at least one finger engine to multiply the symbols with the channel estimation, and a combiner to combine multipath components of the multi-rate channels.

11. The receiver of claim 9 wherein at least one high-rate rake finger is one of a plurality of high-rate rake fingers, each high-rate rake finger to despread a multipath component of each multi-rate channel, and
   wherein at least one finger engine is one of a plurality of finger engines, each finger engine to multiply the channel estimation with the symbols from a corresponding high-rate rake finger for each of the several multi-rate channels, and
   wherein the combiner coherently combines symbols from the multipath components from the finger engines for the several multi-rate channels.

12. The receiver of claim 9 wherein at least one high-rate rake finger and the high-rate rake are implemented with hardware elements, and wherein the low-rate signal-processing path comprises:
   at least one low-rate finger to despread a multipath component of spread-spectrum signals comprising the fixed-rate channels; and
   a digital signal processor (DSP) to generate a channel estimation and to coherently combine symbols from at least one low-rate finger with the channel estimation.

13. The receiver of claim 12 wherein the DSP assigns at least one high-rate finger a multi-path component of the several multi-rate channels and at least one low-rate finger a multi-path component of the fixed-rate channels.

14. The receiver of claim 13 wherein at least one high-rate rake finger is one of a plurality of high-rate rake fingers, each high-rate rake finger to despread a multipath component of each multi-rate channel, and wherein the DSP performs frequency and time tracking to synchronize the high-rate fingers.

15. The receiver of claim 2 further comprising an interpolator to receive baseband samples from an analog front end and raise a sampling rate of the baseband samples to provide the baseband samples with an increased sampling rate in parallel to both the high-rate signal-processing path and the low-rate signal-processing path for use by rake fingers.

16. The receiver of claim 2 wherein the high-rate and low-rate signal-processing paths are part of a low-level portion of the receiver which despreads and decodes the physical channels, and
wherein the receiver further comprises a high-level portion to map the physical channels to transport channels.

17. A method for receiving spread-spectrum signals comprising:
despreading multi-rate channels in a high-rate signal-processing path with a plurality of despreading factors; and
despreading fixed-rate channels in a low-rate signal-processing path with a predetermined despreading factor,
wherein the high-rate signal-processing path and the low-rate signal-processing path comprise parallel signal-processing paths to concurrently despread the multi-rate and fixed-rate channels and generate, respectively, first and second data outputs.

18. The method of claim 17 wherein at least one high-rate rake finger despreads spread-spectrum signals comprising the multi-rate channels, wherein each multi-rate channel has a different spreading code allowing for the substantially simultaneous reception of several multi-rate channels.

19. The method of claim 18 wherein the despreading the multi-rate channels comprises:
despreading one multi-rate channel of the several received multi-rate channels with a corresponding spreading code;
separating control symbols and data symbols for each of the despread multi-rate channels; and
buffering the control and data symbols for each multi-rate channel.

20. The method of claim 19 further comprising:
generating the corresponding spreading codes for simultaneously despreading each of the several multi-rate channels;
multiplying the data symbols with the channel estimation for each of a plurality of multipath components; and
combining multipath components of the multi-rate channels.

21. The method of claim 17 wherein the multi-rate channels have a spreading factor ranging approximately from 4 to 256, and the fixed-rate channels has a spreading factor of approximately 256.

22. The method of claim 20 wherein despreading the multi-rate channels is performed by at least one high-rate rake finger implemented with hardware elements, and wherein despreading the fixed-rate channels is performed with at least one low-rate finger to despread a multipath component of spread-spectrum signals comprising the fixed-rate channels, and wherein a digital signal processor (DSP) generates a channel estimation and coherently combines symbols from at least one low-rate finger with the channel estimation.

23. The method of claim 22 further comprising assigning, by the DSP, at least one high-rate finger a multi-path component of the several multi-rate channels, and at least one low-rate finger a multi-path component of the fixed-rate channels.

24. A wideband code division multiple access (WCDMA) receiver to despread multi-rate spread-spectrum physical channels having a variable spreading factor with a plurality of despreading factors and to despread fixed-rate spread-spectrum physical channels having a fixed spreading factor with a predetermined spreading code, the receiver comprising a high-rate signal-processing path to receive the multi-rate channels and a low-rate signal-processing path to receive the fixed-rate channels, wherein the high-rate signal-processing path and the low-rate signal-processing path comprise parallel signal-processing paths configured to concurrently despread the multi-rate and fixed-rate channels respectively and generate first and second data outputs, the high-rate signal-processing path comprises:
a plurality of high-rate rake fingers to despread a multi-path component of each multi-rate channel; and
a high-rate rake to read symbols from the high-rate rake fingers, to multiply the symbols by a channel estimation, and combine the multi-path components from each rake finger,
and the low-rate signal-processing path comprises:
at least one low-rate finger to despread a multipath component of spread-spectrum signals comprising the fixed-rate channels; and
a digital signal processor (DSP) to generate a channel estimation and to coherently combine symbols from at least one low-rate finger with the channel estimation.

25. The receiver of claim 24 wherein the high-rate rake fingers comprise:
a set of correlators, each correlator to despread one multi-rate channel of the several received multi-rate channels with a corresponding spreading code;
a framer to separate control symbols and data symbols for each of the despread multi-rate channels;
a buffer for each multi-rate channel to store the control and data symbols for the corresponding multi-rate channel; and
a code generator to generate the corresponding spreading codes for despreading each of the several multi-rate channels.

26. The receiver of claim 25 wherein each multi-rate channel has a different spreading code allowing for the substantially simultaneous reception of several multi-rate channels, and wherein the multi-rate channels have a spreading factor ranging approximately from 4 to 256, and the fixed-rate channels has a spreading factor of approximately 256.

* * * * *

UNITED STATES PATENT AND TRADEMARK OFFICE
CERTIFICATE OF CORRECTION

PATENT NO. : 7,010,016 B2　　　　　　　　　　　　　　　　　　　　　　　　Page 1 of 1
APPLICATION NO. : 10/025090
DATED : March 7, 2006
INVENTOR(S) : Margulis et al.

It is certified that error appears in the above-identified patent and that said Letters Patent is hereby corrected as shown below:

On the Title page, in field (56), under "Foreign Patent Documents", in column 2, line 1, after "12/1999" insert -- H04B1/707F3 --.

In column 8, line 31, in claim 8, delete "second rate" and insert -- second rake --, therefor.

In column 8, line 32, in claim 8, delete "first and second rates" and insert -- first and second rakes --, therefor.

Signed and Sealed this

Eleventh Day of May, 2010

David J. Kappos
*Director of the United States Patent and Trademark Office*